United States Patent [19]

Winzer et al.

[11] 4,325,605
[45] Apr. 20, 1982

[54] BRANCHING ELEMENT FOR MONOMODE LIGHT WAVEGUIDES AND THE METHOD OF MANUFACTURE

[75] Inventors: Gerhard Winzer; Franz Auracher, both of Munich, Fed. Rep. of Germany

[73] Assignee: Siemens Aktiengesellschaft, Berlin & Munich, Fed. Rep. of Germany

[21] Appl. No.: 90,357

[22] Filed: Nov. 1, 1979

[30] Foreign Application Priority Data

Nov. 29, 1978 [DE] Fed. Rep. of Germany ....... 2851667

[51] Int. Cl.³ .............................................. G02B 5/172
[52] U.S. Cl. ................................. 350/96.15; 350/320
[58] Field of Search ............... 350/96.15, 96.16, 96.20, 350/96.21, 320; 250/227

[56] References Cited

U.S. PATENT DOCUMENTS

| | | | |
|---|---|---|---|
| 3,619,030 | 11/1971 | Tomii et al. | 350/96.15 X |
| 3,870,396 | 3/1975 | Racki et al. | 350/96.16 |
| 3,977,764 | 8/1976 | d'Auria et al. | 350/96.16 |
| 4,165,496 | 8/1979 | Di Domenico, Jr. et al. | 350/96.15 X |
| 4,173,390 | 11/1979 | Käch | 350/96.16 |
| 4,176,908 | 12/1979 | Wagner | 350/96.15 |

FOREIGN PATENT DOCUMENTS

52-64939  5/1977  Japan .................. 350/96.15

OTHER PUBLICATIONS

Bloem et al, "Fiber-Optic Coupler", *IBM Tech. Discl. Bull.*, vol. 16, No. 1, Jun. 1973, pp. 146-147.
"Simple Coupler Taps Fiber-Optic Cables", *Electronics*, Dec. 20, 1973, pp. 30-31.
Kuwahara et al, "A Semi-Transparent Mirror-Type Directional Coupler...", *IEEE Trans. on M'Wave Th. & Tech.*, Jan. 1975, pp. 179-180.

*Primary Examiner*—John D. Lee
*Attorney, Agent, or Firm*—Hill, Van Santen, Steadman, Chiara & Simpson

[57] ABSTRACT

A branching element for a single mode light waveguide characterized by monomode guides extending from a semi-transmissive reflective layer that is inclined to the axis thereof and the branching light waveguide is a multimode light waveguide which is positioned to receive light reflected by the layer from one of the monomode guides. The device has a good coupling efficiency and can be manufactured by a cheap and simple process.

3 Claims, 3 Drawing Figures

1

BRANCHING ELEMENT FOR MONOMODE LIGHT WAVEGUIDES AND THE METHOD OF MANUFACTURE

BACKGROUND OF THE INVENTION

The present invention is directed to a branching element for coupling out a light component or fraction of the guided light from a monomode light waveguide and the method of manufacturing the element.

Monomode light waveguides, preferably in the form of glass fiber light waveguides, are particularly suited for the transmission of light signals without intermediate amplification over very long distances for example multiples of 10 km. In order to be able to connect an apparatus to such a monomode waveguide along the length of the distance, branching elements are required which couple out a light component from the monomode waveguide and convey it to the particular apparatus.

SUMMARY OF THE INVENTION

It is the object of the present invention to provide a branching element which exhibits a good coupling out efficiency and which can be manufactured by a simple and inexpensive process.

To accomplish these tasks, the present invention is directed to a branching element for the purpose of coupling light out of a light component from a monomode light waveguide. The branching element comprises a structure including two monomode light waveguides each having an end surface, a first member mounting said monomode waveguides in axial alignment with the end surfaces being separated by a semi-transmissive reflective layer provided in the member and extending obliquely to the axis of each of said waveguides; and a multimode light waveguide having an end surface, said multimode waveguide being received in an additional member and being mounted on the first member with the end surface of the multimode waveguide being positioned on a surface of the first member in a location for receiving light decoupled from one of the pair of monomode waveguides by the semi-transmissive layer, said additional member positioning the multimode waveguide to extend at an angle to said one monomode waveguide with said angle being bisected by a surface normal of the reflective layer. Preferably, the first member has at least one substantially flat surface and said multimode waveguide and second or additional member is mounted on the flat surface of the first member with a flushed engagement therewith.

Due to the fact that the branching light waveguide consists of a multimode light waveguide, the branched off light signal cannot be transmitted over as large a distance as it could with a monomode guide; however, since the apparatus connected to the multimode guide most often are disposed relatively close to the monomode waveguide, this is not necessarily a problem and the multimode guide will thus be sufficient. A decisive advantage of the utilization of multimode guides for the branching off of light from the light waveguide consists in the fact that the multimode waveguide in comparison with a monomode guide has a considerably larger light guiding cross section. Thus, the proposed branching element can be manufactured without precision adjustments and exhibits a good coupling efficiency.

Moreover, the employment construction principle with a partially transmissive or semi-reflective or semi-transparent reflective layer or coating offers a considerable production technique advantage. The branching element can be manufactured in a self adjusting method which is of a decisive significance for the alignment of the two monomode guides. This advantage is apparent when the device is manufactured by mounting a continuous monomode waveguide such as a monomode fiber, in an initial member which has been provided with two stop or guide surfaces disposed at an angle relative to one another and extending parallel to the monomode waveguide. Then the method includes separating the member into two parts by cutting obliquely to the axis of the monomode fiber to provide the parts with the cut surfaces, polishing the cut surfaces of the two parts to its desired optical quality, applying a semi-transmissive reflective layer on one of the polished cut surfaces, providing a support member having a support surface and a stop surface extending therefrom at an angle, positioning the two parts with the guide surfaces engaging the support and stop surface of the support members with the polished surfaces facing each other and being in parallel, moving the two parts relative to each other to bring the two polished surfaces into engagement with each other as at least one of the parts is moved along the surface of the support member and joining the two parts to form the first member. Subsequently, the method includes mounting a second member containing a multimode waveguide on the first member with the multimode waveguides being arranged in a position to receive the light decoupled from one of the monomode waveguides.

DESCRIPTION OF THE PREFERRED EMBODIMENTS

Figure 1:
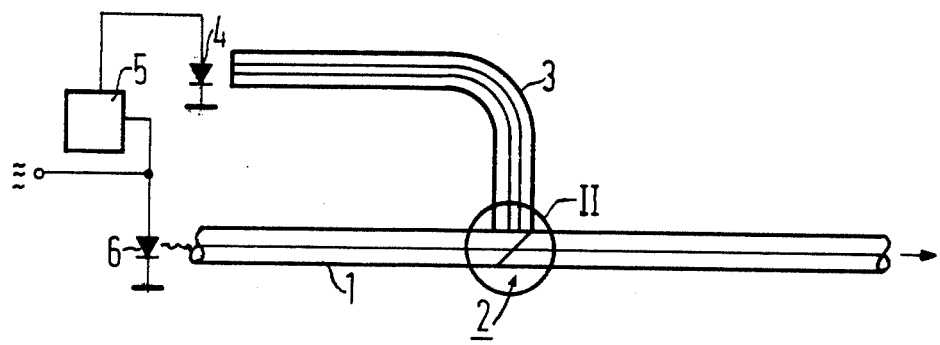
FIG. 1 is a schematic illustration of monomode waveguides with a branch element in accordance with the present invention used to couple light out of the monomode waveguides and into a receiver.

The principles of the present invention are particularly useful in a branching element generally indicated at 2 in FIG. 1 for a monomode waveguide 1. As illustrated, the branching element 2 has a multimode waveguide 3 extending therefrom and leading to a light sensitive detector 4. This detector 4 is coupled to a regulating circuit or control circuit 5 and delivers the actual sensed intensity thereto. The control circuit 5 controls the current for a laser diode 6, whose light is coupled into the monomode waveguide 1. Thus, the power level of the waveguide 1 will remain constant regardless of aging of the laser diode. It should be noted, that each of the waveguides 1 and 3 can be an optical fiber waveguide.

Figure 2:
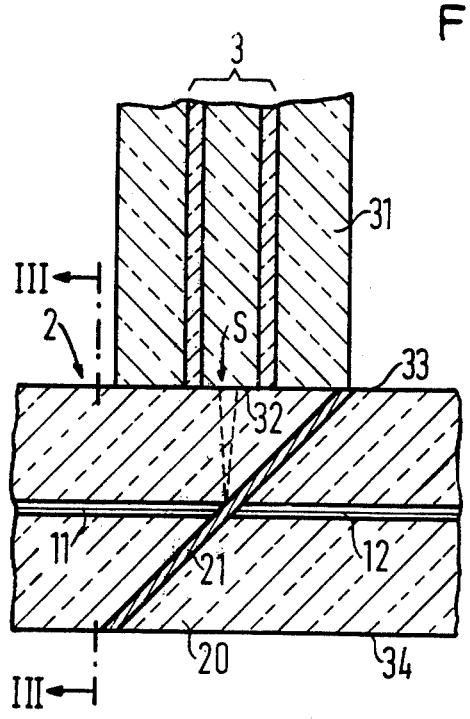
FIG. 2 is an enlarged cross sectional view of the branching element taken from a circle II of FIG. 1.

As illustrated in FIG. 2, the element 2 consists of a body or first member 20, which is formed of a glass capillary in whose opening two aligned monomode waveguides 11 and 12 are mounted with their end surfaces being separated by a semitransmissive reflective layer 21, which extends obliquely to the axis of each of the aligned waveguides 11 and 12 and to the body or member 20. The two monomode waveguides 11 and 12 can be optical fibers, which form part of the monomode guide 1 of FIG. 1. A multimode waveguide or fiber 3 is mounted in an additional or second member 31 and is connected to the member 20 with an end face 32 of the multimode fiber 3 being arranged at a location S at which light emerges from the element 2 which light has been coupled out of the monomode waveguide 11 and reflected by the reflective layer 21. As illustrated, the member 20 is provided with a flat surface 33 on which the end surface 32 of the waveguide 3 and the member 31 have been mounted in a flushed arrangement.

The mounting is such that the waveguide 3 and the monomode guide 11 form an angle, which is bisected by the surface normal of the reflective layer 21. This approximately means that the angular deviations are permissable which are smaller than half the acceptance angle of the multimode guide 3 in addition to that of the monomode guide. However, it is best if there is no angular deviation. In the example of the embodiment of FIG. 2, the angle between the monomode guide 11 and the multimode guide 3 amounts to approximately 90° and the reflective layer is inclined 45° relative to the monomode waveguides 11 and 12 and the multimode guide 3.

Since the cross section of the light conducting parts of the multimode fiber 3 which cross section is several 10 μm and more, are considerably greater, than the cross section of the monomode fiber, which has a maximum of several μm, no fine adjustments need be carried out during the placement of the multimode fiber 3 on the structure or the member 20 of the element 2. This is because the lateral offset or displacement of up to the diameter of the multimode waveguide are permissable.

The device is manufactured by providing an initial capillary member in which a continuous monomode guide is received. This capillary member with the monomode waveguide is then separated into two parts by cutting obliquely across the member at an oblique angle such as 45° to the axis of the monomode waveguide. The cut surfaces formed by cutting the capillary member and fiber are then polished to the desired optical quality and a reflective layer is then deposited on one of the polished cut surfaces. The semi-transmissive reflective layer such as 21 can be provided such as by vapor deposition.

Figure 3:
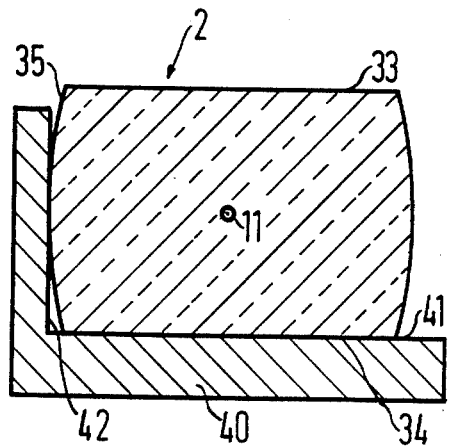
FIG. 3 is a cross sectional view taken along lines III—III of FIG. 2 with the support member.

The two body parts are then brought together and cemented to one another to form the first member 20 of the branching element 2. Preferably, the capillary was provided with the two stop or guide surfaces such as 34 and 35 that extend at an angle to each other and are parallel to the continuous fiber. As illustrated the surface 34 is also parallel to the surface 33. The parts are then placed on a support member 40 which has a guide or support surface 41 and a lateral stop surface 42, which as illustrated in FIG. 3, will engage the surfaces 34 and 35, respectively. With the two parts placed on the member 40 with the polished surfaces facing each other and extending parallel, the members are moved relative to each other such as by moving one of the members to bring the two polished surfaces into engagement with the reflective layer 21 interposed therebetween. After bringing the two parts together they are fixedly interconnected for example by means of an optical adhesive to form the first member or body 20 as illustrated in FIG. 2.

The accuracy in the alignment of the fibers depends solely upon the quality of the surfaces 34 and 35 as well as the surfaces 41 and 42 of the support member 40. By grinding and/or polishing the surfaces such as 34 and 35, a very high degree of precision can be obtained so that the losses due to lateral offset between the two monomode fibers 11 and 12 subsequent to joining the parts together is so small that hardly any loss will occur.

Subsequent to joining the two parts together to form the member 20, the additional or second member 31 containing the multimode guide 3 is secured to the top surface 33. It is expedient if the surface 33 is a planar surface which also extends parallel to the surface 34 and the axis of the monomode waveguides 11 and 12. The placing of the monomode waveguide 3 on the member 20 requires an adjustment step; however, this adjustment step is not a precision adjustment step as mentioned hereinabove.

Instead of using a capillary as either the first member or additional member, it is also possible to utilize a member in which a guide groove is introduced in one surface and the monomode or the multimode guide is then mounted in the guide groove of its respective member. Particularly suited for this member is a crystal which possesses a property of being able to be anisotropically etched for example, silicon. The grooves are then preferably manufactured by means of anisotropic etching.

Although various modifications may be suggested by those versed in the art, it should be understood that we wish to embody within the scope of the patent granted hereon all such modifications as reasonably and properly come within the scope of our contribution to the art.

We claim:

1. A branching element for the purpose of coupling out a light component from a monomode light waveguide, said branching element comprising a structure including two monomode light waveguides each being a monomode fiber with a light conducting part and having an end surface, a first member mounting said monomode waveguides in axial alignment with the end surfaces being separated by a semi-transmissive reflective layer provided in the member and extending obliquely to the axis of said waveguides; and a multimode light waveguide being a multimode fiber having an end surface and having a light conducting part with a cross-section being considerably greater than the cross-section of the light conducting part of the monomode fibers, said multimode waveguide being received in an additional member, said additional member being mounted directly on the first member with the end face of the multimode waveguide being directly positioned on a surface of the first member in a location for receiving light decoupled from one of the pair of monomode waveguides by the semi-transmissive reflective layer, said additional member positioning the multimode waveguide to extend at an angle to said monomode waveguides with said angle being bisected by a surface normal of the reflective layer.

2. A branching element according to claim 1, wherein the first member has at least one substantially flat surface extending parallel to the axially aligned monomode fibers, and said multimode fiber and additional member are directly mounted on said flat surface of the first member with a flush engagement therewith.

3. A method of manufacturing a branching element having a first member supporting a pair of monomode light waveguides in axial alignment with end surfaces of the waveguides being separated by an obliquely extending semi-transmissive reflective layer and having a multimode waveguide mounted by a second member on the first member with an end face thereof positioned to receive light decoupled from one of said monomode waveguides as the light is reflected by the semi-transmissive reflective layer, said method comprising the steps of mounting a continuous monomode fiber in an initial member, said initial member being provided with two guide surfaces disposed at an angle relative to one another and extending parallel to the monomode fiber, separating the member into two parts by cutting obliquely to the axis of the monomode fiber to provide two parts with cut surfaces, polishing the cut surfaces of the two parts to a desired optical quality, applying a semi-transmissive reflective layer on one of the polished cut surfaces, providing a support member having a support surface and a stop surface extending therefrom at an angle, positioning the two parts with the guide surfaces engaging the support and stop surfaces of the support member with the polished surfaces facing each other and being in parallel, moving the two parts relative to each other to bring the two polished surfaces into an engagement with each other as at least one of the parts is moved along the surfaces of the support member and joining the two parts to form the first member, subsequently mounting a second member containing a multimode fiber directly on the first member with the multimode fiber being arranged in a position to receive light decoupled from one of said monomode fibers.

* * * * *